INVENTORS
DANIEL R. CURRAN
WILLIAM J. GERBER
BY ALFRED L. W. WILLIAMS
James A. Smith
ATTORNEY

INVENTORS
DANIEL R. CURRAN
WILLIAM J. GERBER
ALFRED L.W. WILLIAMS
BY
ATTORNEY

INVENTORS
DANIEL R. CURRAN
WILLIAM J. GERBER
BY ALFRED L.W. WILLIAMS
ATTORNEY

United States Patent Office 3,423,700
Patented Jan. 21, 1969

3,423,700
PIEZOELECTRIC RESONATOR
Daniel R. Curran, Cleveland, William J. Gerber, Willowick, and Alfred L. W. Williams, Cleveland, Ohio, assignors to Clevite Corporation, a corporation of Ohio
Filed Apr. 30, 1963, Ser. No. 276,896
U.S. Cl. 332—72 13 Claims
Int. Cl. H03b 5/32

This invention relates to piezoelectric resonators and, more particularly, to an improved piezoelectric resonator for filter applications.

The application of piezoelectric resonators in low frequency filters has been a subject of interest for many years. Most of the activity in this area originally concerned the use of simple quartz bars. However, consideration has been given to more complex structures such as quartz tuning forks.

Within the last few years the development of piezoelectric ceramics has resulted in the development of ceramic resonators and filters. These have included simple resonators, multi electroded resonators and cascaded combinations thereof, mechanically coupled pairs of resonators and ceramic ladder filters, covering a frequency from 170 kc. to 6 mc.

It is a principal object of the present invention to provide an improved low frequency ceramic resonator which is operative piezoelectrically in a flexural mode of vibration.

Another object of the invention is to provide an improved ceramic element possessing simplicity of fabrication and ease of mounting.

Another object of the invention is to provide an improved low cost ceramic filter and mounting means therefor.

Other objects and advantages will become apparent from the following description taken in conjunction with the accompanying drawings wherein.

Figures 1, 3:
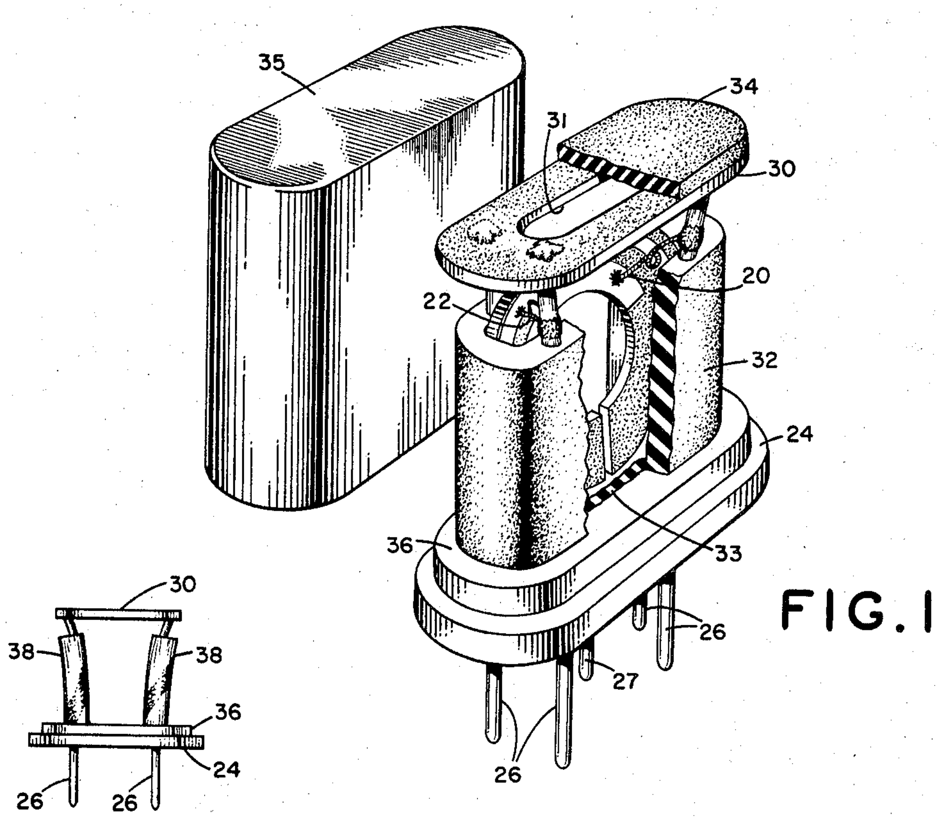
FIGURE 1 is a perspective view of a filter assembly embodying the invention with the cover removed.
FIGURE 3 is a front view of the supporting structure shown in FIGURE 1 illustrating a structural modification.
Figure 2:
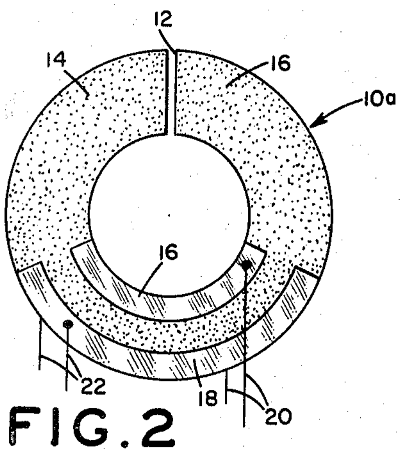
FIGURE 2 is an enlarged detail of the resonator element shown in FIGURE 1.

Referring specifically to FIGURES 1 and 2 of the drawings there is shown a thin flat ring-shaped piezoelectric element identified generally by the reference numeral 10*a*. The element 10*a* is cut or split to define a slot 12 between adjacent end portions 14 and 16 and is formed from piezoelectric ceramic material, suitable compositions of which will hereinafter be described.

As shown in FIGURE 2 the element 10*a* is provided with a predetermined electrode configuration on opposite surfaces thereof which in this instance comprises aligned inner arcuate electrode segments 16 on opposite face surfaces of element 10*a* and outer arcuate electrode segments 18 on said surfaces. These electrode segments may comprise fired on silver material or may be formed by other suitable electroding means, i.e., a chemical deposition and photo etching process. To facilitate electrical connection and to support the element 10*a* during operation thereof a pair of lead wires 20 are attached at one end to electrode segments 16 and a second pair of lead wires 22 are attached at one end to segments 18, respectively.

The element 10 is preferably supported by an assembly comprising a base 24 of insulating material through which a plurality of (in this case 4) electrically conductive pins 26 extend as shown in FIGURE 1. Alternately base 24 may be metal with the pins 26 insulated therefrom. Pins 26 have portions extending below the base 24 for connection to an electric circuit, such as by soldering, or to be received in a suitable plug-in type of socket (not shown). It will be apparent that the base 26 may be provided with an additional dummy pin 27 to provide a pin arrangement complemental to standard commercially available sockets.

Attached to the upper end of pins 26 is a thin plate 30 of insulating material which maintains the spaced relationship of pins 26 and imparts rigidity to the assembly. The plate 30 is provided with an opening 31 as shown above the resonator element 10*a*.

The element 10*a* is suspended by lead wires 20 and 22 as shown in FIGURE 1 between pins 26 with the portion containing slot 12 in the lowermost position. Perferably lead wires 20 and 22 are of compliant material such as phosphor bronze and may be coiled or looped as shown to impart additional flexibility to the mounting of element 10*a* to permit free unrestrained vibration thereof in a flexural mode as will later be described. One end of each of the lead wires 20 and 22 is attached to its associated electrode in the nodal region of the element 10*a* while the other end is attached to one of the pins 26 by soldering. With this supporting arrangement damping and mechanical reactance effects of the lead wires 20 and 22 on operation of the element 10*a* are minimum and the necessity of utilizing mechanically tuned supporting parts is avoided.

To protect the element 10*a* and prevent contact thereof with pins 26 cushioning means a protective band 32 of soft rubber-like material is molded on the pins 26 prior to mounting of element 10*a* and attachment of lead wires 20 and 22. The band 32 is provided with an integrally molded floor portion 33 providing a cushion on the upper surface of base 24 to be engaged by the resonator element 10*a* upon excessive downward displacement thereof.

Similarly a separate part 34 of the same material corresponding in size to the plate 30 is positioned between the plate 30 and bottom of cover 35 to be engaged by the resonator element 10*a* upon excessive upward displacement thereof. This cushioning means in effect provides a "padded cell" for protection of the resonator 10*a* with sufficient clearance that the resonator 10*a* hangs free but with clearance limited to the extent that large stresses cannot be developed at the point of attachment of lead wires 20 and 22 to electrodes 16 and 18.

The outer dimensions of band 32 corresponds to the inner dimensions of a metal can or cover 35 which is adapted to be slidably fitted over the assembly illustrated in FIGURE 1 to provide a protective metal case. The inner surfaces of can 35 engage the outer surface of band 32, the end thereof slidably received by a complemental surface 36 of the base 24.

The supporting and protective structure thus described for the resonator element 10*a* provides a durable and rigid supporting means which, while permitting substantially unrestrained vibration of the element 10*a* insures against large lead wire stresses and contact of the element 10*a* with the pins 26 during vibration thereof.

Another embodiment of the supporting structure for element 10*a* is shown in FIGURE 3 of the drawings. This embodiment differs from that shown in FIGURE 1 in the structure of the cushioning means for element 10*a*. In the embodiment of FIGURE 3, pins 26 (only two of which are illustrated) are provided with soft rubber sleeves 38 which provides a cushioning effect similar to the band 32. The embodiment of FIGURE 3 is less desirable in some applications than the embodiment of FIGURE 1 in that the sleeves 38 only inhibit displacement of resonator element 10 in a direction perpendicular to its plane and do not engage the interior surface of cover 34 to assist in the retention thereof.

Referring now specifically to FIGURE 2 of the drawings the resonator element 10*a* is preferably fabricated from a piezoelectric ceramic composition such as for example a lead titanate-lead zirconate composition of one of the types disclosed in U.S. Patent No. 3,006,857 or copending application Ser. No. 164,076 assigned to the same assignee as the present invention. For wide bandwidth applications a composition such as $$Pb_{.95}Sr_{.05}(Zr_{.53}Ti_{.47})O_3+0.7$$

wt. percent $Cr_2O_3$ (1) having a high electromechanical coupling coefficient and a moderate mechanical Q is utilized while for medium to narrow bandwidths a composition such as $Pb_{.95}Mg_{.05}(Zr_{.45}Ti_{.55})O_3+0.7$ wt. percent $Cr_2O_3$ (2) having a moderate coupling coefficient and a higher mechanical Q is used. It will be apparent to those skilled in the art, however, that various ceramic compositions other than those mentioned are also suitable and that specific compositions are only disclosed for exemplary purposes.

Upon fabrication of element 10*a* to the configuration shown in FIGURE 2 and application of the electrodes 16 and 18 poling of the ceramic material interposed between the two pairs of electrodes is accomplished by application of an electric field to each opposite pair of electrodes to thereby polarize the material between each electrode pair in the thickness direction.

When thus polarized the element 10*a* can be driven piezoelectrically in a flexural mode with all particle motion in the plane of the element. By applying an input signal to either pair of leads wires an output may be taken from the other of magnitude dependent on the frequency of the applied signal with respect to the resonant frequency of the element 10*a*.

The vibration of the element 10*a* in the flexural mode can be viewed as an opening and closing of the slotted ring configuration thereof or as a double cantilever mode with the halves of the ring moving in opposite directions. As opposed to the ideal double cantilever which would have a single node of motion, the split ring mode has a pair of nodes located close together on either side of the center line (diameter drawn through the slot) directly opposite the slot. However, the operation and characteristics are generally similar to an ideal double cantilever mode.

The operation of the resonator element 10*a* illustrated in FIGURE 2 is analogous to operation of a thermally responsive bimetallic element. More specifically, during operation length expansion of the piezoelectric material interposed between electrodes 16 will occur simultaneously with length contraction of the piezoelectric material interposed between electrode 18 to cause the ring to vibrate in a flexural mode in the plane thereof.

The resonant frequency of the element 10*a* is directly proportional to ring width *w* and inversely proportional to neutral ring diameter $D_n$ squared and may be expressed as follows:

$$F=\frac{Nw}{D_n^2}$$

In the above equation N represents a constant of proportionality which is a function of the physical constants of the ceramic and may be referred to as the frequency constant. The frequency constant N has been evaluated for a number of split ring elements with diameters ranging from 0.3 to 1.1 inches, and found to be approximately 10 kilocycle inches with a spread of values over a ten percent range.

The neutral diameter $D_n$ in the above equation is the diameter of zero stress or neutral circumference and may be expressed in terms of ring width *w* and outside ring diameter D by the following equation:

$$D_n=d-\frac{2w}{1+\frac{(D-2w)^{1/2}}{D}}$$

Resonant frequency can be selected on the basis of ring diameter and width for elements with narrow slots. Beyond this resonant frequency can be increased by at least a factor of six by increasing the slot width, i.e., reducing the length of the arms. Thus the element 10*a* possesses substantial tuning versatility. It has been found for example that an element 10*a* having an outside diameter of 0.6 inch and an inside diameter of 0.25 inch can be tuned from 8 kc. to 60 kc. by varying the slot width and the inside diameter. It has been found that the mode of vibration changes as the slot width is increased during the tuning process from a folded flexural mode to a single flexural mode. However, the nodes of motion remain in approximately the same position throughout the tuning process and other than frequency the performance of the resonator element 10*a* is substantially unaffected by the dimensional changes.

Figure 4:
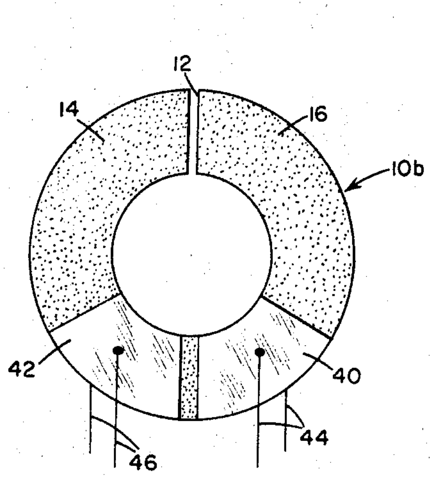
FIGURE 4 is a detail similar to FIGURE 2 illustrating another embodiment of the resonator element.

In FIGURE 4 of the drawings there is illustrated a second embodiment 10*b* of the resonator element which is identical in configuration of the ceramic piezoelectric ring but differs in the electrode arrangement. The element 10*b* of FIGURE 4 comprises a pair of aligned electrodes 40 on opposite face surfaces positioned to the right of center line drawn through slot 12 and a second pair of electrodes 42 on the opposite face surfaces to the left of said center line. The electrode pairs are thus positioned in spaced relationship on opposite sides of the center line, as shown, the ceramic material between each electrode pair being polarized in the thickness direction.

The electrodes 40 are provided with lead wires 44 respectively and electrodes 42 are similarly provided with lead wires 46. The element 10*b* depicted in FIGURE 4 may be also supported by the structure shown in FIGURE 1, the lead wires 44 and 46 in this instance also being utilized to provide a compliant mechanical support and establish electrical connection of electrodes 40 and 42 to pins 26.

Figure 5:
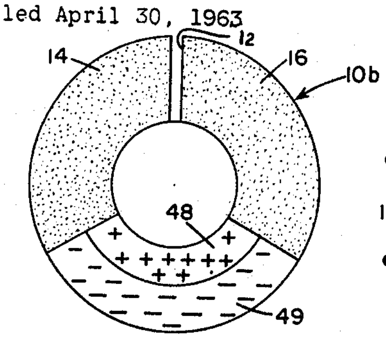
FIGURE 5 is a view similar to FIGURE 4 illustrating the method of polarizing the resonator element of FIGURE 4.

The operation of the embodiment of the resonator element 10*b* illustrated in FIGURE 4 is generally similar to that of the FIGURE 2 embodiment. In this case, however, a different polarizing method is employed during fabrication of the ring to achieve the desired flexural mode vibration and double cantilever effect. Referring specifically to FIGURE 5 of the drawings prior to application of the permanent electrodes 40 and 42 inner and outer arcuate segments 48 and 49 of the ring are oppositely poled in the thickness direction by utilizing temporary poling electrodes and fields of opposite polarity. After such opposite poling of segments 49 and 50 is accomplished the permanent electrodes 40 and 42 are attached by a process which does raise the temperature of the ceramic material to the point of depolarizing it, i.e., chemical deposition and photo etching process.

In operation of the embodiment illustrated in FIGURE 4 the element **10*b* will be driven piezoelectrically in the flexural mode by applying an input signal to one pair of lead wires, and an electrical output can be taken from the other pair. In this embodiment the inner and outer oppositely polarized segments 48 and 49** undergo simultaneous length contraction and expansion respectively to produce the desired double cantilever effect and a flexural mode of vibration in the plane of the ring.

Figure 6:
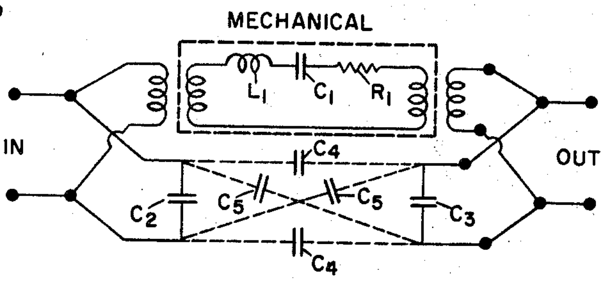
FIGURE 6 is a schematic circuit diagram illustrating the equivalent circuit of the resonator elements shown in FIGURES 2 and 4.

The equivalent electric circuits for the resonator elements **10*a* and 10*b*** are generally the same and a circuit applicable to either embodiment in the frequency region around mechanical resonance is shown in FIGURE 6. As illustrated the equivalent circuitry includes a tuned circuit comprising an inductance $L_1$, a capacitance $C_1$ and a resistance $R_1$ representing the effective mass, compliance, and damping in the resonant mechanical system; static or clamped capacitances $C_2$ and $C_3$ for each electrode pair; and stray interelectrode capacitances $C_4$ and $C_5$ for each electrode pair. Below are tabulated approximate values of the equivalent circuit components for resonator elements of either the FIGURE 2 or FIGURE 4 type having an outside diameter of .6 inch, inside diameter of .25 inch, a slot width of .15 inch, and a ring thickness of 0.03 inch. Values are tabulated for both the ceramic compositions hereinbefore described.

| | Composition (2) | Composition (1) |
|---|---|---|
| $L_1$, henries | 50 | 6.1 |
| $R_1$, ohms | 6,400 | 4,900 |
| $C_1$, pf | 3.5 | 18 |
| $C_2$, pf | 200 | 298 |
| $C_3$, pf | 180 | 294 |
| $C_4$ and $C_5$, pf | 4.4 | 7.2 |
| Mechanical Q | 640 | 190 |

The elements **10*a* and 10*b* when operated conventionally as an unbalanced filter with one electrode of each pair connected to a common ground will have a pass band centered near mechanical resonance. Additionally, it has been found that the distributed capacitance in combination with the mechanical circuit will provide a single pole of attenuation which can be located on either side of the pass band depending on the phase relationship and which can be shifted from one side to the other by interchanging ground terminals. For example, if the resonator element 10*a* of FIGURE 2 were electrically connected as shown schematically in FIGURE 7 with the electrodes 16 and 18 on one surface of the ring connected to a common ground and the electrodes 16 and 18** on the opposite surface utilized as input and output electrodes a pole of attenuation at a frequency above the pass band will occur. On the other hand, if an electrode of each pair on opposite sides of the ring are connected to a common ground as shown in FIGURE 8, a pole of attenuation at a frequency below the pass band will occur.

Figure 7:
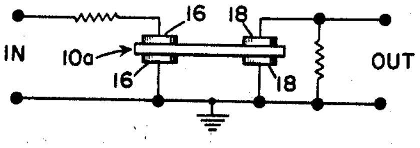
FIGURES 7 and 8 are schematic circuit diagrams showing alternate input and output circuits for the resonator elements of FIGURES 2 and 4.
Figure 8:
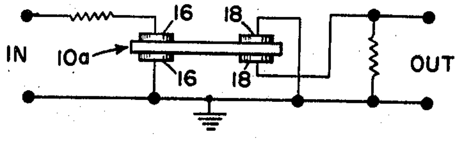

The circuit connection depicted in FIGURES 7 and 8 are applicable to either of the resonator elements **10*a* and 10*b* and the pole of attenuation may be selectively located in the same manner with either. It has been found, however, that for the same circuit the resonator elements 10*a* and 10*b*** produce poles of attenuation on opposite sides of the pass band, respectively.

Figure 9:
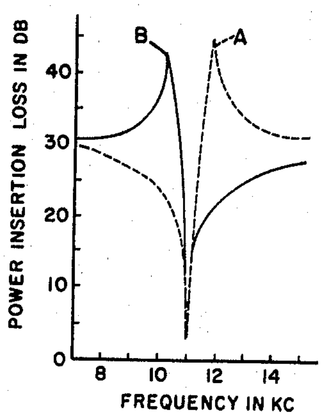
FIGURES 9, 10, 11 and 12 are curves illustrating the operational characteristics of the resonators shown in FIGURES 2 and 4.

The selective positioning of the pole of attenuation is shown by the characteristic curve of FIGURE 9 which is a graph of power insertion loss versus frequency for the resonator element **10*a*** of FIGURE 2 having the physical dimensions hereinbefore disclosed and having the ceramic composition (2) hereinbefore noted in connection with the equivalent circuit of FIGURE 6. Specifically, the curves shown by the dash and solid lines were obtained with the circuits shown in FIGURES 7 and 8, respectively, using a resistive matched signal generator and load. The curve corresponding to the circuit of FIGURE 7 illustrates a pole of attenuation at point A or the high side of the pass band while the curve corresponding to the circuit of FIGURE 8 illustrates a pole of attenuation at point B or the low side of the pass band.

Figure 10:
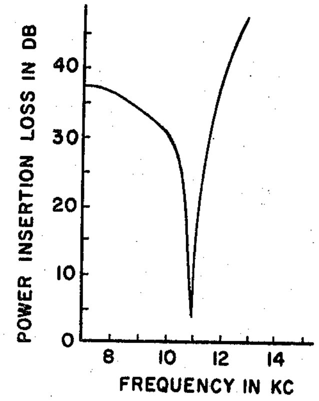

It has been found that the location of the pole of attenuation for the resonator element **10*b* shown in FIGURE 4 is oppositely located with respect to the pass band. When the element 10*b* is connected as shown schematically on FIGURE 7 a pole of attenuation will occur below the pass band. On the other hand with the circuit connections shown in FIGURE 8 a pole of attenuation will occur above the pass band. In FIGURE 10 there is shown a single power insertion loss curve for the resonator element 10*b*** of FIGURE 4 connected as shown schematically in FIGURE 8. The corresponding curve for the circuit of FIGURE 7 will be similar with the pole of attenuation reversed.

Both embodiments of the resonator element shown in FIGURES 2 and 4 exhibit good filter characteristics such as bandwidths in the order of one percent of center frequency, minimum losses of less than 3 db, and 20 db/6 db bandwidth ratios of about 7.

Figure 11:
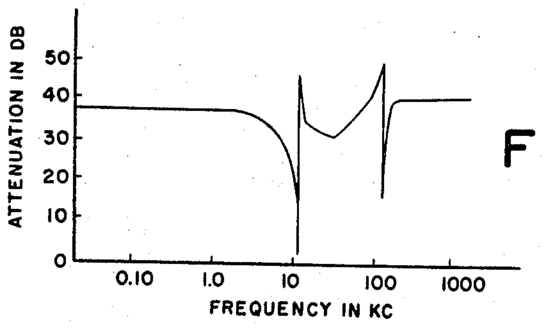

In FIGURE 11 there is shown a curve of attenuation versus frequency over a wide frequency range for the resonator element **10*a* shown in FIGURE 2 having the ceramic composition (2) and the dimensions hereinbefore disclosed. A corresponding curve for the resonator element 10*b*** utilizing the same ceramic composition is shown in FIGURE 12.

Figure 12:
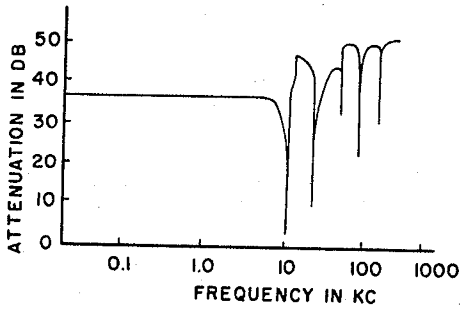

The curves depicted in FIGURES 11 and 12 illustrate that split ring configuration is inherently free from spurious responses. Neither of the FIGURE 2 and FIGURE 4 embodiments disclose excitable modes below the fundamental resonant frequency. As shown by the curve of FIGURE 11 the first overtone response of the resonator **10*a* occurs at about 12 times the fundamental frequency. The resonator 10*b* disclosed in FIGURE 4 on the other hand as shown by the curve of FIGURE 12 exhibited a strong usable overtone response at about 2.3 times the fundamental frequency. The absence of overtone responses with the resonator 10*a* is believed to be the result of the particular electrode configuration utilized. It is believed that the electrodes 16 and 18 being symmetrical with respect to the node section of the element 10*a*** tend to suppress unwanted modes.

The resonant element **10*b* is somewhat more flexible in design than the resonator element 10*a* in that a wider range of interelectrode capacitances $C_4$ and $C_5$ (controlled by separation between electrode pairs 40 and 42) can be achieved. Hence somewhat better filter characteristics can be achieved. However, the absence of overtone responses with the resonator element 10*a*** disclosed in FIGURE 2 render this construction more desirable in many applications.

One of the most useful features possessed by both the resonator elements **10*a* and 10*b*** is the single pole of attenuation which can be located on either side of the pass band by selective circuit connection. This feature makes it possible for pairs of filter elements to be connected in cascade to give a combined filter with a pole of attenuation on each side of the pass band.

Figure 13:
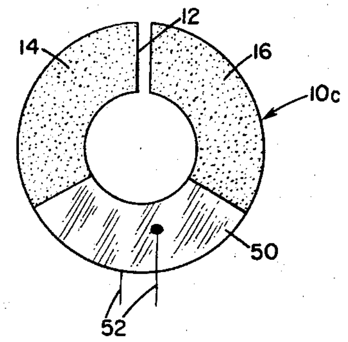
FIGURE 13 is an enlarged detail illustrating another embodiment of the resonator element.

In FIGURE 13 of the drawings we have illustrated a two terminal resonator element **10*c* comprising a single pair of aligned electrodes 50 on opposite face surfaces of the resonator element and having lead wires 52 extending therefor. It will be apparent that the embodiment of the resonator element illustrated in FIGURE 13 may also be supported by the structure illustrated in FIGURE 1 through the provision of an additional lead wire on each electrode and by electrically connecting selected pairs of pins 26**.

Figure 14:
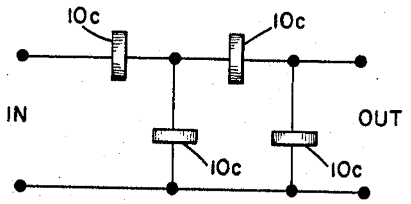
FIGURE 14 is a schematic circuit diagram of a ladder type filter illustrating the application of the resonator element shown in FIGURE 13.
Figure 15:
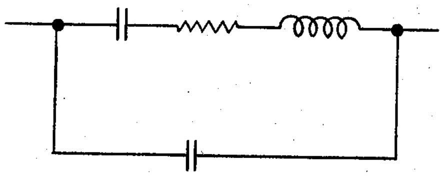
FIGURE 15 is an equivalent circuit for the resonator element shown in FIGURE 13.

The element disclosed in FIGURE 13 has particular utility in a ladder type filter circuit such as shown in FIGURE 14 and has an equivalent circuit of the configuration shown in FIGURE 15 comprising a series connected resistance, capacitance and inductance shunted by the interelectrode capacitance of the electrodes 50. The equivalent circuit for such a two terminal piezoelectric resonator is well known to those skilled in the art and further description is deemed unnecessary.

The embodiment of FIGURE 13 is poled in the thickness direction in the manner illustrated in FIGURE 5 in connection with the resonator element **10*b* to obtain inner and outer arcuate segments of piezoelectric material of opposite polarity which produce the desired double cantilever effect. Similar to the element 10*b* temporary electrodes are utilized to effect poling prior to attachment of permanent electrodes 50**.

Figure 16:
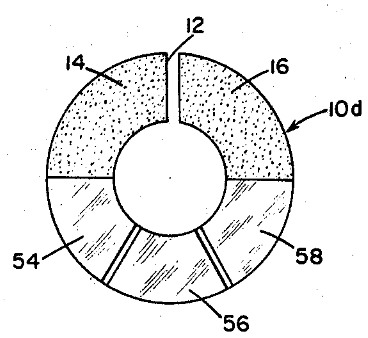
FIGURE 16 is a detail illustrating still another embodiment of the resonator element.
Figure 17:
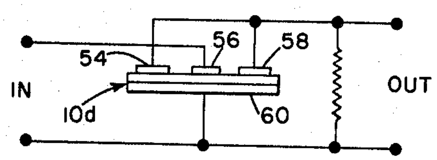
FIGURE 17 is a schematic illustration of a typical filter circuit utilizing the resonator of FIGURE 16.

Referring to FIGURES 16 and 17 of the drawings there is shown still another form of the resonator element identified by the reference numeral **10*d*. The element 10*d* is provided with three spaced electrodes 54, 56 and 58 on one side thereof and a single electrode 60 on the opposite side thereof. A typical filter circuit utilizing the resonator element 10*d* is depicted in FIGURE 17. As shown, an input signal may be applied across electrodes 56 and 60 to produce an output between electrodes 54 and 60 and between electrodes 58 and 60. In the circuit arrangement shown the electrodes 54 and 58** are connected in parallel.

The element **10*d* is also polarized prior to application of electrodes 54, 56, 58 and 60 and subsequently electroded in the same manner as the resonator element 10*b* and as discussed in connection with FIGURE 5 to have inner and outer arcuate segments of opposite polarity. Accordingly, element 10*d* also vibrates in a flexural mode in the plane of the ring. The electrode arrangement shown in FIGURE 16 for element 10*d* has been found to result in better overtone suppression characteristics than obtained with element 10*b*** and to be more desirable in this respect.

While several embodiments of the invention have been herein shown and described it will be apparent to those skilled in the art that many changes may be made in the construction and arrangement of parts disclosed without departing from the scope of the invention as defined in the appended claims.

It is claimed and desired to secure by Letters Patent of the United States:

1. A piezoelectric resonator element comprising: a flat ring of piezoelectric ceramic material of a predetermined thickness and non-continuous circumference defining a transverse slot in one portion thereof; electrode means on opposite face surfaces of a second portion of said ring diametrically opposite to said one portion; the ceramic material intermediate said electrodes being polarized in the thickness direction; said ring being vibratory in a flexural mode defining a pair of nodes on opposite sides of the ring diameter coinciding with said slot and defining a resonant frequency F expressed by the equation:

$$F=\frac{Nw}{D_n^2}$$

where N is the frequency constant, $w$ is the width of said ring and $D_n$ is the neutral diameter of said ring.

2. A piezoelectric resonator element comprising: a flat circular ring of piezoelectric ceramic material having a transverse slot in one portion thereof to be non-continuous in circumference; a first pair of electrodes positioned on opposite face surfaces of a second portion of said ring diametrically opposite from said slot, said first pair of electrodes comprising aligned arcuate segments of electrically conductive material positioned adjacent the inner periphery of said ring; a second pair of electrodes positioned on opposite face surfaces of said second ring portion; said second pair of electrodes comprising aligned arcuate segments of electrically conductive material positioned adjacent the outer periphery of said second portion in spaced relationship with said first pair; said ring having the ceramic material interposed between each of said electrode pairs polarized in the thickness direction whereby said ring is vibratory in a flexural mode in the plane of said ring defining a pair of nodes located on opposite sides of the ring diameter coinciding with said slot in response to application of signals of predetermined frequency to said electrode means.

3. A piezoelectric resonator as claimed in claim 2 wherein each of said first and second electrode pairs is symmetrical with respect to the ring diameter coinciding with said slot and wherein the ceramic material interposed between each pair of electrodes has the same polarity of polarization.

4. A piezoelectric resonator element comprising: a circular ring of piezoelectric ceramic material having a transverse slot in a first portion thereof to be non-continuous in circumference; said ring having polarized spaced parallel arcuate segments adjacent the inner and outer peripheries of said ring, respectively, in a second portion thereof diametrically opposite from said first portion, said arcuate segments being oppositely polarized in the thickness direction; and electrode means on opposite face surfaces of said second portion; said ring being vibratory in a flexural mode defining a pair of nodes located on opposite sides of the ring diameter coinciding with said slot in response to application of signals of predetermined frequencies to said electrode means.

5. A piezoelectric resonator element as claimed in claim 4 wherein said electrode means comprises a pair of spaced electrodes on one face surface of said second portion spaced on opposite sides of the ring diameter coinciding with said slot and at least one electrode on the opposite face surface of said second portion.

6. A piezoelectric resonator element as claimed in claim 4 wherein said electrode means comprises a single electrode on each of the opposite face surfaces of said second portion covering said polarized segments.

7. A piezoelectric resonator element as claimed in claim 4 wherein said electrode means comprises three spaced electrodes on one face surface of said second portion and a single electrode on the opposite face surface of said second portion.

8. A piezoelectric resonator element as claimed in claim 7 wherein said electrode means comprises a first pair of aligned arcuate segments of electrically conductive material positioned on opposite surfaces of said second portion of said ring adjacent the inner periphery thereof and a second pair of aligned arcuate segments of electrically conductive material positioned on opposite surfaces of said second portion of said ring adjacent the outer periphery thereof.

9. A piezoelectric resonator as claimed in claim 7 wherein each of said first and second pairs of electrode segments is symmetrical with respect to said ring diameter coinciding with said slot and wherein the ceramic material interposed between each pair of electrode segments has the same polarity of polarization.

10. A piezoelectric resonator element as claimed in claim 7 wherein said ring has polarized spaced parallel arcuate segments in said second portion thereof adjacent the inner and outer periphery of said second portion, respectively, said arcuate segments being polarized in the thickness direction.

11. A piezoelectric resonator element as claimed in claim 10 wherein said electrode means comprises a pair of separate electrodes on one face surface on said second portion positioned on opposite sides of said ring diameter coinciding with said slot and at least one electrode on the opposite face surface of said second portion.

12. A piezoelectric resonator element as claimed in claim 10 wherein said electrode means comprises a single electrode on each of the opposite face surfaces of said second portion covering said polarized segments.

13. A piezoelectric resonator element as claimed in claim 10 wherein said electrode means comprises three spaced electrodes on one face surface of said second portion and a single electrode on the opposite face surface of said second portion.

References Cited

UNITED STATES PATENTS

| | | | |
|---|---|---|---|
| 2,224,891 | 12/1940 | Wright | 310—9.6 |
| 2,230,649 | 2/1941 | Mason | 333—72 |
| 2,614,143 | 10/1952 | Williams | 310—9.7 |
| 2,814,741 | 11/1957 | Minnich | 310—9.1 |
| 2,820,911 | 1/1958 | Klingsporn | 310—9.1 |
| 2,830,274 | 4/1958 | Rosen | 333—32 |
| 2,928,069 | 3/1960 | Peterman | 340—10 |
| 2,994,791 | 8/1961 | Shinada et al. | 310—9.7 |
| 3,114,849 | 12/1963 | Poschenrieder | 310—9.7 |

OTHER REFERENCES

Wireless Engineer, July 1953, vol. 30, No. 7, pp. 161–163 (editorial entitled: The Quartz Tuning Fork).

Motorola Final Report dated Aug. 30, 1954 entitled "Low Frequency Ring Resonators," made of record by applicant in paper No. 5, copy entered into file as paper No. 6, Figs. 1, 2, 4, 5 and page 9 relied on.

Mason: "Physical Acoustics," QC 233 M 37, pub. by Van Nostrand, 1958 (pages 53–55).

Motorola Comm. and Electronics Div. Reports "Low Frequency Ring Resonators," Aug. 30, 1954, 333–71 (pages 54–56).

HERMAN KARL SAALBACH, *Primary Examiner.*

C. BARAFF, *Assistant Examiner.*

U.S. Cl. X.R.

310—9.1, 9.6, 9.7